Figure 1:
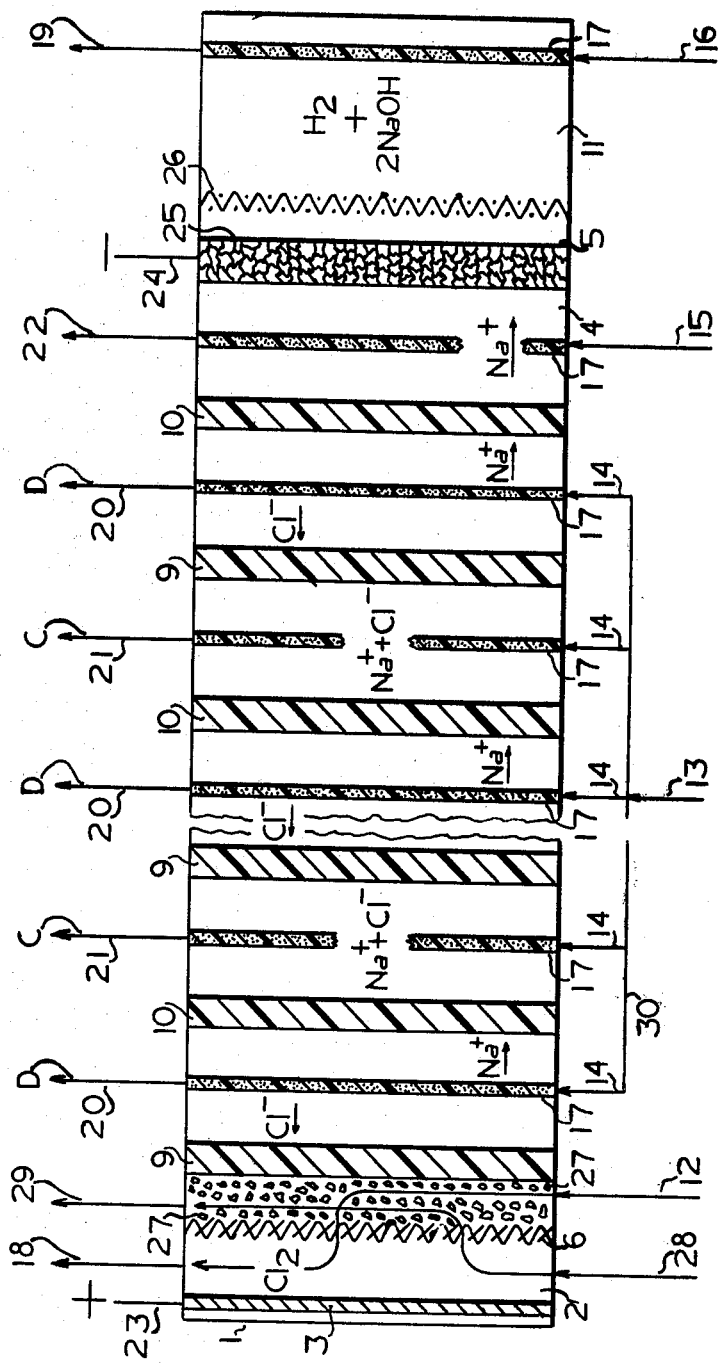

:::

United States Patent [19]

Cole

[11] 4,295,950
[45] Oct. 20, 1981

[54] DESALINATION WITH IMPROVED CHLOR-ALKALI PRODUCTION BY ELECTROLYTICDIALYSIS

[76] Inventor: Marc Cole, 1057 C Argyll Cir., Lakewood, N.J. 08701

[21] Appl. No.: 156,735

[22] Filed: Jun. 5, 1980

Related U.S. Application Data

[63] Continuation-in-part of Ser. No. 71,991, Sep. 4, 1979, abandoned.

[51] Int. Cl.³ ................. B01D 13/02; C25B 1/34; C25B 1/46
[52] U.S. Cl. .................. 204/180 P; 204/301; 204/98; 204/128
[58] Field of Search ............. 204/180 P, 301, 128, 204/98

[56] References Cited

U.S. PATENT DOCUMENTS

| | | | |
|---|---|---|---|
| 3,017,338 | 1/1962 | Butler et al. | 204/180 P |
| 3,775,272 | 11/1973 | Danna | 204/128 |
| 4,046,654 | 9/1977 | Cole | 204/128 |

*Primary Examiner*—Howard S. Williams

[57] ABSTRACT

An electrodialysis cell and process for desalination of aqueous brine with concomitant improved production of chlor-alkali, using a novel porous structure, the interconnected micro-pores of which are filled with an alkali metal amalgam, which may function as a cathode or as a cation permeable diaphragm, and using a saturated metal chloride aqueous solution as anolyte.

19 Claims, 2 Drawing Figures

DESALINATION WITH IMPROVED CHLOR-ALKALI PRODUCTION BY ELECTROLYTICDIALYSIS

This application is a continuation-in-part of application with Ser. No. 071,991, filed by the present applicant on Sept. 4, 1979, and now abandoned, entitled "Improvements in Sea Water Desalination by Electrolyticdialysis".

This invention relates to desalination of aqueous brine or sea water by electrodialysis with concomitant production, in an improved manner, and with the same electric energy as used in said desalination, of halogen, hydrogen, and a pure, concentrated solution of sodium hydroxide by electrolysis of part of said brine or sea water. More particularly, said chlor-alkali and desalted water are produced using a substantially saturated metal chloride solution as anolyte and by use of an immobilized liquid alkali-metal amalgam which fills the interconnected micro-pores of a porous structure which may function either as a cathode or as a cation-permeable membrane, in an electrodialysis cell.

The word "Electrolyticdialysis" used herein refers to a cell and process for electrodialysis and economical electrolysis performed simultaneously.

To applicants knowledge, with the exception of the application cited above, no cell or process has been described wherein the electrode streams of an electrodialysis cell are of commercially useful, profitable quality.

The electrolyticdialysis cell and process of the present invention are characterized by use of a novel porous structure, the interconnected micro-pores of which are filled with an immobilized liquid alkali metal amalgam which functions as either a cathode or a cation-permeable membrane, and which permits production of pure, concentrated caustic soda solution, and by use of a substantially saturated metal chloride solution as anolyte which permits production of chlorine with high electrical efficiency by inhibiting water splitting at the anode of said cell. A U.S. Pat. No. 3,364,127 explains at length the advantage of the use of substantially saturated metal chloride solution as anolyte for production of chlorine with high current efficiency by electrolysis of sea water. Said patent does not describe a cell with concomitant desalination. The importance of the present cell and process is that desalination of sea water for use in irrigation has to the present not been invented, this now being made possible.

The cell electrolyticdialysis of the present invention incorporates many of the usual features of an electrodialysis cell; and includes an anode in an anode compartment, preferably followed by a liquid-permeable membrane, suitably made of a polymer such as polyvinylchloride or made of glass cloth; following said liquid permeable membrane is disposed a series of cell pairs. By "cell pairs" reference is made to a repeating group consisting of an anion permeable membrane, an intermembrane separator, a cation permeable membrane, and a second intermembrane separator. By "anion permeable- or cation permeable membrane" reference is made to a perm-selective membrane made suitably of a polymer such as polystyrene with basic or acid radicals, respectively, attached thereto. Said intermembrane separators are suitably made of porous polymers to distribute fluid flow between said perm-selective membranes.

When the novel, immobilized, liquid, alkali metal amalgam filled structure is used as a cathode, the said cathode is disposed following the last said cell pair, and abutting said cathode is a denuding chamber which contains a last intermembrane separator. Disposed between said cathode and said last intermembrane separator in said denuding chamber is preferably used a denuding catalyst, for example, chromium, vanadium, or molybdenum.

When said novel immobilized liquid alkali metal amalgam filled structure is used as a cation permeable membrane, said membrane is disposed following the last cell pair of the cell of this invention. Said novel membrane is followed by an intermembrane separator and disposed following said intermembrane separator is a cathode, of for example, steel, in a cathode compartment. Said cathode may be constructed for oxygen depolarization as described in U.S. Pat. No. 3,775,272, and said depolarization may be suitably used in the cell of the present invention.

The liquid permeable membrane, above referred to, serves to protect the anion permeable membrane of the first cell pair following said liquid permeable membrane from attack by chlorine diffusing from the anode compartment. Further protection for said anion permeable membrane may suitably be afforded by disposition of active carbon between said liquid permeable membrane and said anion permeable membrane. Said carbon may be stationary, or may be circulated between said membranes; a suitable slurry of said carbon may be made by stirring about one pound of carbon in about one gallon of anolyte, and the said slurry may be fed to the cell of this invention by a slurry feeder or a proportioning pump. Anolyte which filters thru the liquid permeable membrane from the slurry is to be added to said slurry before recirculation. To inhibit chlorine diffusion from the anode compartment, anolyte, which is fed to said cell thru said liquid permeable membrane, should suitably have a flow rate of at least 1.5 cc/hr. per cm$^2$ of said membrane surface.

Construction of components of electrodialysis cells suitably used in the cell of this invention, such as anion- and cation permselective membranes, intermembrane separators, end blocks, gaskets, electrode frames, piping, valves, and pumps are described in R. & D. report titled "High Temperature Electrodialysis" phase V, by Leitz et. al. available at the office of Water Resources and Technology, Dep't of Interior, published in June 1974.

Materials suitable for construction of said novel interconnected micro-porous structures when said structures are used as cation permeable diaphragms may be selected from polymers and metals substantially inert to the fluids to which said structure is exposed, but when said novel structure is used as a cathode herein, it is preferred to use electrically resistant materials, such as polymers for construction. Among said polymers suitably used are high density polyethylene, polytetrafluorethylene, polypropylene, polyisobutylene, polyvinylchloride, and natural and synthetic rubbers. Among said metals may be used iron, steel, stainless steel, nickel, titanium, copper, and their alloys. The said polymers or said metals are sintered from fine powders. When polymers are used to form said novel structure for use as a cathode herein, an electrical conductor is provided by embedding a metal grid of, for example, steel, in the polymer powder prior to sintering, the said grid to extend from the formed microporous structure. The pores of said interconnected microporous structures are preferably of a mean diameter of between about 5 microns and about 70 microns; sheets of said structures are available commercially, made to specification as to pore size and material of construction. The amalgam for use herein may be made by dissolving an alkali metal, preferably sodium, in mercury to form a liquid alloy containing from about 0.1 to about 0.3 weight percent of alkali metal. To fill the pores of said microporous sheet, when said sheet is constructed of a polymer, said sheet is clamped between two screens, suitably of steel, and the assembly is clamped in liquid-tight fashion to the walls of of suitable vessel, and said assembly is immersed in said amalgam. A differential pressure of, for example, dry nitrogen is applied to one surface of said sheet to the extent of at least 15 psi. for sheets with larger pore diameters, increasing said pressure to fill the pores with smaller diameters with amalgam. When sheets of microporous metal are to have their pores filled with amalgam, said sheets, without further support may be fastened to the walls of said vessel. Thereafter the procedure is the same as described for sheets of polymer. Said differential pressure is continued until there is no further weight gain of said sheets.

The process of the present invention is further described in connection with the appended drawings.

Objects of the present invention are:

Achieving products of two energy-intensive industries, chlor-alkali production and sea water desalination with the same electrical energy;

Achieving desalination of sea water at net cost which will permit said water to be used for irrigation;

Ability to regulate ratio of desalted water produced to chloralkali produced by adjustment of the number of cell pairs in the novel cell;

Production of pure concentrated NaOH solution with minimum equipment and energy expenditure;

Production of chlorine with high electrical efficiency;

Provision of a relatively inexpensive amalgam-based cation permeable membrane and/or cathode which blocks back migration of hydroxyl ions;

Provision of a cell with low decomposition overvoltage;

Provision of a cell with relatively minor amounts of mercury required, and with substantially slight mercury losses.

In the two drawings following, the amalgam filled porous structures shown differ only in possible materials of construction. However, since the said structures in each drawing fulfill different functions, the processes of each drawing differ somewhat, altho leading to the same products, differences in function and process being fully explained following the drawings.

The above referred to aqueous saturated solution of metal chloride used herein as anolyte is not restricted to use of sodium chloride but the chloride of any metal having a valence of one to three may be used. Thus metals of the alkali family such as potassium, or of the alkaline earth family such as calcium, or metals with a valence of three such as iron or aluminum may be used in the form of chlorides to make up said aqueous saturated solution for use as anolyte.

Advantages of the use of the novel amalgam-filled microporous structure are varied according to use of the structure as a diaphragm or a cathode. When used as a diaphragm, the lower overvoltage of a steel cathode will reduce required electric energy, and the back migration of hydroxyl ions is avoided so that grades of commercially concentrated, pure sodium hydroxide may be directly produced. When used as a cathode, the novel structure provides an essentially vertical immobile wall of amalgam which permits convenient denuding of said amalgam to form concentrated pure caustic soda solution. In use of the novel structure either as a diaphragm or as a cathode small amounts of mercury are required, and mercury losses are greatly reduced over those in a mercury cathode cell of conventional design, and escape of gas is facilitated. To avoid formation of insoluble compounds, the sea water to be desalinated should preferably be freed of calcium and magnesium ions. Also for the same reason, the pH of the anolyte should preferably be adjusted, suitably with use of hydrochloric acid. Before the saturated solution of metal chloride is recycled as anolyte, adjustments are preferably made as follows. Because of a slight loss of cation thru anion permselective membrane 9 with which said anolyte is in contact, an addition of metal chloride equivalent to said loss is suitably added. Also water of hydration, added to anolyte by chloride ion, is suitably evaporated before recycle; and any loss of acid is adjusted for. Said adjustments will be illustrated in Examples to follow.

FIG. 1 illustrates the invention wherein the novel amalgam microporous structure functions as a cathode, and is a diagrammatic drawing of an electrodialytic cell used in accordance with this invention, wherein the piping is shown schematically, and arrows indicate the direction of flow of influent and effluent fluids. Omitted are gaskets, end blocks, electrode frames, valves and pumps, details of which are referred to above.

Referring to FIG. 1, the electrolyticdialysis cell is indicated by the numeral 1, and comprises an anode compartment 2, containing an anode 3 suitably followed by a liquid permeable membrane 6. Following membrane 6 is disposed a first anion permselective membrane 9 followed by an intermembrane separator 17. Membrane 17 is followed by a cation permselective membrane 10, which is followed by another intermembrane separator 17. Membranes 9,17,10, and 17 in sequence, are called "cell pairs" herein; the first intermembrane separator 17 of a cell pair provides a flow path for water diluted with respect to salt, called "diluate" and noted as "D" in FIG. 1, and the second intermembrane separator 17 of said cell pair provides a flow path for water concentrated with respect to salt, called "concentrate" and noted as "C" in FIG. 1. A conveniently handled number of cell pairs may be installed in cell 1; however, the number of cell pairs chosen for the electrolyticdialysis cell of the present invention depends on the desired ratio of chlor-alkali to desalted water, the larger the volume of desalted water to quantity of chlor-alkali desired, the greater will be the number of cell pairs chosen per electrolyticdialysis cell. Each anion permselective membrane is numbered 9, each intermembrane separator is numbered 17, and each cation permselective membrane is numbered 10. Following the intermembrane separator 17 of the last cell pair of the cell of FIG. 1 is disposed novel cathode 5, the amalgam of which is numbered 25. Cathode 5 is provided with electrical lead 24; a corresponding lead 23 is provided for anode 3. Cathode 5 is disposed, preferably in a vertical position, in a cathode compartment 4. Abutting cathode compartment 4 with its cathode 5 is provided a denuding compartment 11 containing a last intermembrane separator 17, and disposed between said last membrane 17 and cathode 5 is preferably disposed a denuding catalyst, suitably in the form of a chromium plated steel wire grid 26. Grid 26 is suitably held in close proximity to cathode 5 by said last membrane 17 which in turn is supported by an end block (not shown) of cell 1.

Suitably disposed between liquid permeable membrane 6 and the following anion permselective membrane 9 are particals of active carbon 27.

Arrow 12 indicates an inlet and flow path for anolyte to anode 3 thru liquid permeable membrane 6; and arrow 12 may also indicate an inlet for a slurry of active carbon 27. Arrow 18 indicates an outlet for said anolyte and formed chlorine. Arrow 28 indicates an inlet and flow path for a reverse flush, to clear the pores of membrane 6, and arrow 29 indicates an outlet for said reverse flush, and also an outlet for carbon 27. As noted, carbon 27 may either be slowly circulated thru cell 1 as a slurry, or left in place in the position indicated in cell 1 of FIG. 1. Arrow 13 indicates an inlet to a manifold 30 from which arrows 14 indicate an inlet of brine or sea water to be desalted. Arrows 20 indicate outlets for water with reduced salt content marked "D", and arrows 21 indicate outlets salt concentrated water marked "C". Arrow 15 indicates an inlet to cathode compartment 4 for sea water as catholyte, and arrow 22 indicates an outlet for said catholyte. Arrow 16 indicates an inlet for water or caustic soda solution to denuding compartment 11, and arrow 19 indicates an outlet for enriched caustic soda solution and hydrogen.

According to the process of this invention wherein the novel amalgam filled structure is used as a cathode, an anolyte of an aqueous saturated solution of a metal chloride, said metal being selected from the group having a valence of 1 to 3, or a mixture of said metal chlorides is fed into anode compartment 2 of cell 1 thru inlet 12. A brine or sea water is fed via inlet 13, manifold 30, and inlets 14 thru intermembrane separators 17 to contact permselective membranes 9 and 10. Sea water is fed into cathode compartment 4 via inlet 15 thru an intermembrane separator 17 to immerse one face of cathode 5 in said sea water. Water or a caustic soda solution is fed via inlet 16 into denuding compartment 11 to immerse the opposite face of cathode 5 in said water or caustic soda solution.

Anode 3 and the amalgam 25 of cathode 5 are supplied with D.C electric current at a suitable potential. Under the potential gradient established in cell 1, halogen ions are driven thru anion permselective membranes 9, and those halogen ions, principally chloride ions, passing into anode compartment 2 are electrically discharged to form chlorine which leaves cell 1, mixed with anolyte, thru outlet 18. Other halogen ions are driven thru anion selective membranes 9, and cations, principally sodium ions, are driven thru cation selective membranes 10, so that alternating cell pairs form diluate and concentrate respectively; said diluate and concentrate leave cell 1 thru outlets 20 and 21 respectively. Sodium ions passing thru the last cation permselective membrane 10 bordering cathode compartment 4 traverse sea water in said compartment passing thru intermembrane 17 in compartment 4, and are discharged at the amalgam 25 to form sodium atoms. Said sodium atoms, diffusing thru said amalgam, react with water in compartment 11, preferably aided by a catalyst on grid 26, to form caustic soda solution and hydrogen which leave cell 1 thru outlet 19. Suitably, active carbon 27, as a slurry, preferably in anolyte, may be filled into the space between membrane 6 and the next following anion permselective membrane 9, thru inlet 12, and may be flushed out of cell 1 thru outlet 29. Alternatively, said slurry may suitably be circulated thru cell 1 using said inlet and outlet. Part of the said slurry will filter thru membrane 6, and said part should be returned to the slurry before recirculation.

Figure 2:
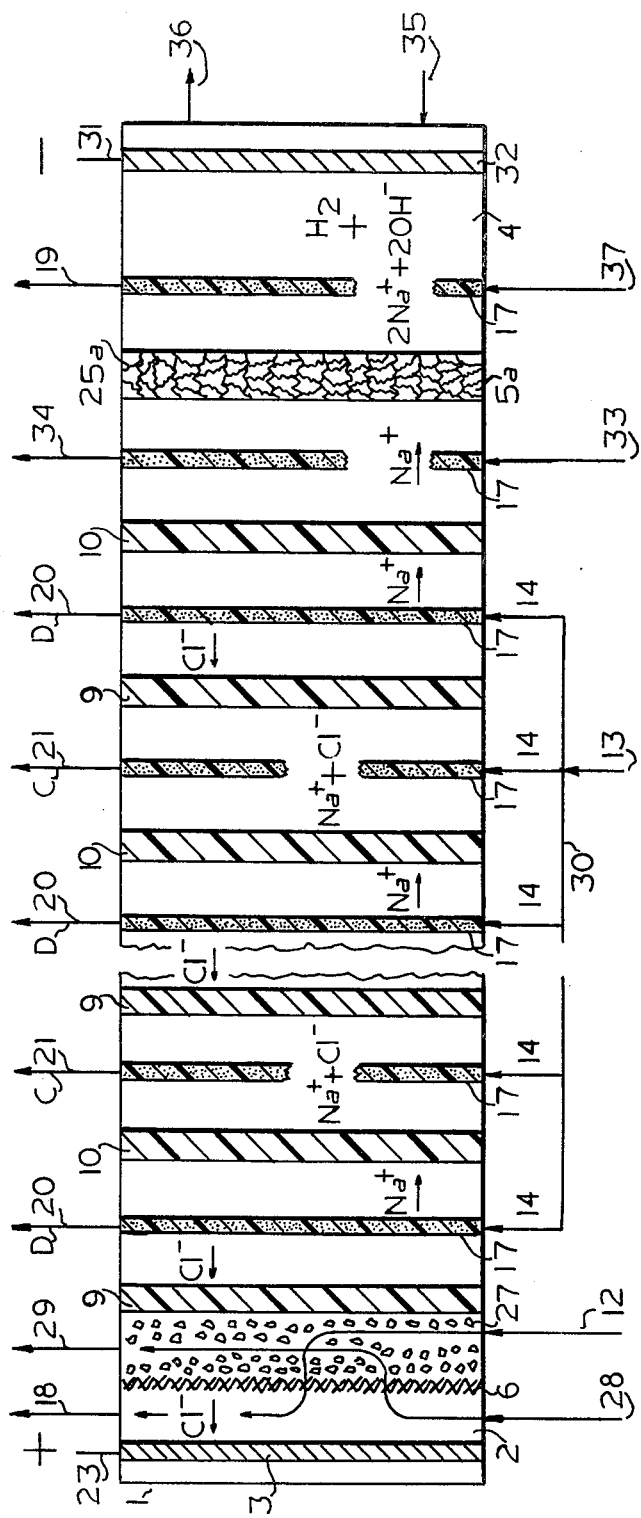

Referring to FIG. 2, the electrolyticdialysis cell indicated by numeral 1 is identical with the cell 1 of FIG. 1 except that the novel liquid immobile alkali metal amalgam filled structure of FIG. 2 is used as a diaphregm to conduct sodium ions to a cathode compartment 4 which contains a cathode 32, and an intermembrane separator 17. The said amalgam filled structure of FIG. 2 is indicated by numeral 5a and the amalgam therein is indicated by 25a. A final change in the cell 1 of FIG. 2 is the provision of inlet 35 and outlet 36 for oxygen or an oxygen containing gas respectively; and that an inlet 33 conducts sea water to one face of membrane 5a, said sea water leaving cell 1 thru outlet 34; and that an inlet 37 conducts water or caustic soda solution to cathode compartment 4, and an outlet 19 conducts enriched caustic soda solution and hydrogen from cell 1. Last said water or caustic soda solution covers the face of membrane 5a which forms a wall of compartment 4. The process of this invention wherein the novel amalgam filled structure 5a functions as a cation permeable membrane differs only from the process wherein the amalgam filled structure 5 is used as a cathode as in FIG. 1, in that sodium ions driven thru the last cation permeable membrane 10 of cell 1 of FIG. 2 traverse the sea water entering cell 1 thru inlet 33 and under the potential gradient of said cell 1 are transmitted by amalgam 25a to cathode compartment 4. Water is split in compartment 4, hydrogen ions being electrically discharged at cathode 32 to form hydrogen atoms which unite to form hydrogen molecules. The sodium ions transmitted into compartment 4 unite with hydroxyl ions to form sodium hydroxide and the so enriched sodium hydroxide solution and hydrogen leave cell 1 thru outlet 19. Depolarization of cathode 32 may be achieved by admitting oxygen to cathode 32 and said oxygen may leave cell 1 thru outlet 36. Cathode 32 is provided with an electrical lead 31.

Thus altho the processes in the cells of FIGS. 1 and 2 differ the end result as concerns product made is the same.

Streams of liquids entering and leaving the cells of FIGS. 1 and 2 are preferably interrupted to avoid any electrical disturbance to said cells.

Desalination by the processes of the present invention is effective not only with sea water but with brines of different salt content than that in sea water. For irrigation, desalted water containing 1000 ppm. or more of salt may be produced; by repeated recycling of diluate, water containing about 500 ppm. of salt may also be produced for domestic and manufacturing use.

Anolyte used in conventional electrodialysis cells containing relatively small concentrations of sodium chloride promotes water splitting at the anode of said cells. The resulting nascent oxygen and hydroxyl ions formed lower electrical efficiency with respect to chlorine formed, and also produce a mixture at said anode from which it is difficult to isolate chlorine. In contrast, use of saturated metal chloride as anolyte inhibits water splitting resulting in high electrical efficiency for chlorine production with ease of chlorine recovery.

Except for specific conditions mentioned herein, operative conditions in carrying out the electrolyticdialysis processes of this invention can be suitably selected from any of the known electrolytic and electrodialysis processes.

Altho the combination of a saturated metal chloride anolyte and a novel amalgam filled structure gives optimum results as regards high current efficiency for halogen production and purity and high concentration of caustic soda solution, and the said combination is thus interdependent as regards said optimum results, nevertheless, it shoud be noted that a saturated metal chloride anolyte may be used in an electrodialysis cell of this invention for production of halogen with high current efficiency, without also using the novel amalgam filled structure in said cell.

With the thinnest permselective membranes and thinnest intermembrane separators commercially available, and at operating temperatures of between 150 and 180 degrees Fahrenheit, desalination of sea water to about 350 ppm. salt requires about one square foot of cell pair membranes per day, and requires about 30 kilowatt hours per kilogallon of sea water. Correspondingly less membrane area and less energy are required for desalination to 1000 ppm. of salt which is satisfactory for most irrigation use. In the electrolyticdialysis cell of this invention, at least part of the salt in brine passing thru one cell pair is converted to chlor-alkali at current efficiencies as indicated in the Examples to follow, and thus it may be seen that, as mentioned, the ratio of chlor-alkali produced may be varied by variation of the number of cell pairs in an electrolyticdialysis cell.

EXAMPLE 1

An electrolyticdialysis cell as depicted in FIG. 1 was employed with an anode coated with ruthenium, and an immobile, liquid, alkali metal amalgam filled microporous structure as cathode. As anolyte a saturated solution containing 300 g./l. sodium chloride was used, sea water from which magnesium had been previously been removed was fed to the cell pairs, and said sea water was used as catholyte. All influent liquids were heated to 150 degrees F. and a potential was established between the electrodes of said cell resulting in a current density of membrane surface of 10 a./dm$^2$. Water was fed to the denuding compartment of said cell.

Diluate was recycled until its salt content was reduced to 1000 ppm. Chlorine generated at said anode had a purity of 99 volume per cent at a current efficiency of 98%, and caustic soda solution containing substantially no chloride was obtained, with a current efficiency of 97% and a concentration of 50% was obtained from said denuding compartment.

Before recycling the said anolyte, 0.07 gram equivalent of sodium chloride was added per gram equivalent of chlorine generated, and 6.4 moles of water per gram equivalent of chlorine generated was evaporated, after which said anolyte was recycled.

EXAMPLE 2

An electrolyticdialysis cell as depicted in FIG. 2 was employed with an anode coated with ruthenium, and an immobile, liquid, alkali metal amalgam filled microporous structure as a cation permeable diaphragm disposed preceding a steel cathode. As anolyte a saturated aqueous solution containing 400 parts of AlCl$_3$.6H$_2$O per 100 parts water (parts given by weight) was used, sea water previously freed of magnesium was fed to the cell pairs, and water was used as catholyte. All influent liquids were preheated to 150 degrees F. and an potential was established between said electrodes resulting in a current density on membrane surface of 6 a./dm$^2$. Sea water freed of magnesium was used to conduct sodium ions from the last cation permselective membrane, preceding said amalgam filled membrane structure, to the said amalgam filled membrane structure used as a cation permeable membrane.

Diluate was recycled until its salt content was reduced to 1000 ppm. Chlorine generated at said anode had a purity of 99 volume percent at a current efficiency of 98%, and caustic soda solution formed at said cathode had a concentration of 0.5 g./l., and was free of chlorides; the current efficiency with which the caustic soda solution was generated was 97%.

The anolyte required no replenishment of aluminum chloride but 6.3 moles of water per gram equivalent of chlorine generated was evaporated from said anolyte before recycling said anolyte.

EXAMPLE 3

An electrodialysis cell was employed with an anode coated with ruthenium, a plurality of cell pairs, and a cathode of steel. Omitted was use of an amalgam filled microporous structure. As anolyte an aqueous solution containing 250 grams of FeCl$_3$. 6H$_2$O in 100 grams of water was used, sea water freed of magnesium was fed to the cell pairs, and a catholyte of 1% caustic soda solution was fed to the cathode compartment. All influent liquids were preheated to 150 degrees F., and a potenial was established between the electrodes of said cell resulting in a current density of 4 a./dm$^2$ of membrane surface.

Diluate was recycled until its salt content was reduced to 1000 ppm. Clhorine generated at said cathode was 97 volume percent at a current efficiency of 94%. Caustic soda solution at the cathode was enriched by 0.5 g./l. and was formed at a current efficiency of 93%.

The anolyte required addition of 0.02 gram equivalent of ferric chloride as anhydrous crystals per gram equivalent of generated chlorine, and, per gram equivalent of generated chlorine, 8 moles of water was removed by evaporation from the anolyte before said anolyte was recycled.

In all of the above examples one mole of hydrogen was liberated per two moles of caustic soda generated.

What is claimed is:

1. In an electrolyticdialysis cell for the concomitant electrolytic decomposition of a part of the alkali metal halide solute of a brine and the electrodialysis of the solute of a further part of said brine, said cell having an anode compartment containing an anode, anolyte inlet means, and outlet means for anolyte and substantially pure halogen, a plurality of cell pairs comprising anion permselective membranes, cation permselective membranes, and intermembrane separators with inlet means for said brine, and outlet means for diluate and concentrate, and preferably a liquid permeable membrane separating said anode from a first neighboring cell pair, and a cathode compartment containing a novel cathode structure, catholyte inlet means and outlet means, and a denuding compartment one wall of which is formed by a surface of said cathode structure, with inlet means for water or caustic soda solution, and outlet means for enriched caustic soda solution and hydrogen, said denuding compartment preferably containing a catalyst for promoting reaction of sodium in a sodium amalgam with water, the improvement consisting of said novel cathode having an immobilized liquid alkali-metal amalgam filling the interconnected micro-pores of said novel cathode structure, said cathode structure being disposed following a neighboring last cell pair and abutting said denuding compartment of said cell, said amalgam and said anode being electrically connected.

2. The cell as claimed in claim 1 in which the said interconnected micro-porous structure of said novel cathode is constructed of a polymeric resin.

3. The cell as claimed in claim 2 in which said polymeric resin is selected from the group consisting of polyethylene, polytetrafluorethylene, polypropylene, polyisobutlyene, polyvinylchloride, and natural and synthetic rubbers.

4. The cell as claimed in claim 1 in which said interconnected micro-pores of said cathode structure have a mean diameter of from about 5 microns to about 70 microns.

5. The cell as claimed in claim 1 in which the said mercury amalgam is a liquid sodium mercury alloy.

6. The cell as claimed in claim 1 in which active carbon is disposed between said liquid permeable membrane and the anion permselective membrane of a first neighboring cell pair.

7. The cell as claimed in claim 1 in which the said catalyst is selected from the group consisting of vanadium, molybdenium and chromium.

8. In a process, conducted in an electrolyticdialysis cell, for the electrolytic decomposition of a first part of the alkali metal halide solute of a separately maintained aqueous brine to produce substantially pure chlorine and substantially pure caustic soda in concentrated solution and hydrogen, and for the concomitant electrodialysis in said cell of the solute of a further part of said separately maintained aqueous brine to form at least partly desalinated water and salt enriched water, the improvement consisting, in combination, of the electrical discharge of the cations of said first part of said solute to atoms at an immobilized liquid metal amalgam filling the interconnected micro-pores of novel cathode immersed in a separately maintained sea water catholyte, and subsequent reaction of said atoms with water of dilute caustic soda solution in a denuding chamber abutting said novel cathode to form said substantially pure concentrated caustic soda solution and hydrogen, and further consisting, in said combination, of the electrical discharge of the anions of said first part of said solute at an anode immersed in a separately maintained substantially saturated metal chloride solution as anolyte, to form substantially pure chlorine, an electric current being passed between said anode and the amalgam of said novel cathode.

9. The process as claimed in claim 8 in which the metal of said substantially saturated metal chloride anolyte is selected from the group consisting of metals having a valence of one to three.

10. The process as claimed in claim 9 in which the said metal is selected from the group consisting of alkali metals, alkaline earth metals, and iron and aluminum.

11. The process as claimed in claim 8 in which the said separately maintained aqueous brine is sea water.

12. The process as claimed in claim 8 in which said sea water has ions removed which form compounds impeding electrical flow prior to use of said water in said cell.

13. In an electrolyticdialysis cell for the concomitant electrolytic decomposition of a part of the alkali metal halide solute of an aqueous brine and the electrodialysis of the solute of a further part of said brine, said cell having an anode compartment containing an anode, anolyte inlet means only for an aqueous substantially saturated metal chloride solution, and outlet means for anolyte and substantially pure halogen, a plurality of cell pairs comprising anion permselective membranes, cation permselective membranes, and intermembrane separators with inlet means only for (said brine) a brine having a salt concentration no greater than that of sea water, and outlet means alternately for (diluate and concentrate) at least partly desalinated water and salt enriched water, and preferably a liquid permeable membrane separating said anode from a first neighboring cell pair, and a cathode compartment containing a cathode, cathode inlet means only for one of the group selected from substantially salt-free water and aqueous caustic soda solution, and outlet means for enriched caustic soda solution and hydrogen, the improvement consisting of the disposition between the last of said cell pairs and the said cathode of said cell of a novel cation permeable, micro-porous diaphragm, the interconnected micro-pores of which are filled with an immobile liquid alkali metal amalgam, said anode and said cathode being electrically connected.

14. The cell as claimed in claim 13 having in combination means for contacting said cathode with an oxygen bearing gas.

15. In a process conducted in a conventional electrodialysis cell having an anode compartment containing an anode, anolyte inlet means, and outlet means for anolyte and substantially pure halogen, a plurality of cell pairs with inlet means for brine and outlet means for diluate and concentrate, a liquid permeable membrane separating said anode from a first neighboring cell pair, and a cathode compartment containing a cathode, catholyte inlet means, and outlet means for enriched caustic soda solution and hydrogen, said process being conducted for the electrolytic decomposition of a part of the alkali metal halide solute of a separately maintained aqueous brine to produce substantially pure chlorine, a relatively dilute caustic soda solution, and hydrogen, and for the concomitant electrodialysis of the solvent of a further part of said separately maintained aqueous brine to form at least partly desalinated water and salt enriched water, the improvement consisting of the electrical discharge of the anions of said solute at said anode immersed in a separately maintained substantially saturated metal chloride anolyte, an electrical current being passed at a suitable voltage between said anode and said cathode of said cell, for production of said substantially pure chlorine, relatively dilute caustic soda solution and hydrogen, and at least partly desalinated water.

16. The cell as claimed in claim 13 in which said anode is immersed in a substantially saturated aqueous metal chloride solution as anolyte.

17. A process for the concomitant production of desalinated water and chlor-alkali conducted in an electrolyticdialysis cell which includes at least an anode in an anode compartment, a plurality of cell pairs consisting of diluate and concentrate compartments alternately, and a cathode in a cathode compartment, wherein the improvement consists in the concomitant use, in combination, of a separately maintained aqueous substantially saturated, metal chloride solution in said anode compartment, in further combination in the use of a brine having a salt concentration no greater than that of sea water in said diluate compartments of said cell pairs, and in still further combination in the use of one of the group selected from substantially salt-fee water and aqueous caustic soda solution in said cathode compartment, said anode and said cathode being electrically connected at a suitable voltage to a source of D.C. current.

18. The process as claimed in claim 17, wherein the metal in said metal chloride is selected from the group of metals having a valence of one to three.

19. A process for the concomitant production of desalinated water and chlor-alkali conducted in an electrolyticdialysis cell which includes at least an anode in an anode compartment, a plurality of cell pairs consisting of diluate and concentrate compartments alternately, and a cathode in a cathode compartment, in which is used concomitantly, and in combination, a separately maintained aqueous substantially saturated metal chloride solution in said anode compartment, in further combination is used a brine having a salt concentration no greater than that of sea water in said diluate compartments of said cell pairs, and in still further combination is used one of the group selected from substantially salt-free water and aqueous caustic soda solution in said cathode compartment, wherein the improvement lies in passing cations under the influence of an electric field thru a novel cation-permeable, microporous diaphragm, the interconnected micropores of which are filled with an immobile, liquid alkali-metal amalgam, said anode and said cathode being electrically connected at suitable voltage to a source of D.C. current.

* * * * *